(12) United States Patent
Okuno et al.

(10) Patent No.: US 11,613,004 B2
(45) Date of Patent: Mar. 28, 2023

(54) DEFLECTION AMOUNT ESTIMATING DEVICE, ROBOT CONTROL DEVICE AND METHOD OF ESTIMATING AMOUNT OF DEFLECTION

(71) Applicant: KAWASAKI JUKOGYO KABUSHIKI KAISHA, Kobe (JP)

(72) Inventors: Junichi Okuno, Akashi (JP); Shinji Kajihara, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 366 days.

(21) Appl. No.: 17/093,651

(22) Filed: Nov. 10, 2020

(65) Prior Publication Data
US 2021/0053238 A1 Feb. 25, 2021

Related U.S. Application Data

(63) Continuation of application No. PCT/JP2019/018751, filed on May 10, 2019.

(30) Foreign Application Priority Data

May 11, 2018 (JP) .............................. JP2018-092479

(51) Int. Cl.
*B25J 9/10* (2006.01)
*B25J 9/06* (2006.01)

(52) U.S. Cl.
CPC ............... *B25J 9/1065* (2013.01); *B25J 9/06* (2013.01); *G05B 2219/39176* (2013.01)

(58) Field of Classification Search
CPC .. B25J 9/06; B25J 9/1065; G05B 2219/39176
See application file for complete search history.

(56) References Cited

U.S. PATENT DOCUMENTS

| | | | | |
|---|---|---|---|---|
| 4,756,662 | A | * 7/1988 | Tanie | B25J 17/0208 |
| | | | | 414/744.5 |
| 2012/0239198 | A1 | 9/2012 | Orita et al. | |
| 2022/0226992 | A1* | 7/2022 | Lee | B25J 9/1638 |

FOREIGN PATENT DOCUMENTS

| | | | |
|---|---|---|---|
| JP | 7-276273 A | | 10/1995 |
| JP | H07276273 A | * | 10/1995 |
| JP | 2011-115878 A | | 6/2011 |

* cited by examiner

*Primary Examiner* — Dale Moyer
(74) *Attorney, Agent, or Firm* — Xsensus LLP (57) ABSTRACT

A deflection amount estimating device is provided for estimating an amount of deflection of a four-bar linkage structure part of a robotic arm. The four-bar linkage structure part swings in a given angle range. The deflection amount estimating device comprises processing circuitry configured to calculate a swing angle of the four-bar linkage structure part; calculate a load received by the four-bar linkage structure part, determine a stiffness value, corresponding to the swing angle of the four-bar linkage structure part, based on a stiffness-value determining function indicating a correlation between the stiffness value and the swing angle of the four-bar linkage structure part, the stiffness value indicating a value of each element in a stiffness matrix associating the load with the amount of deflection of the four-bar linkage structure part; and calculate the amount of deflection of the four-bar linkage structure part based on the load and the stiffness matrix.

19 Claims, 4 Drawing Sheets

DEFLECTION AMOUNT ESTIMATING DEVICE, ROBOT CONTROL DEVICE AND METHOD OF ESTIMATING AMOUNT OF DEFLECTION

CROSS-REFERENCE TO RELATED APPLICATIONS

The present application is a bypass continuation of and claims priority to PCT/JP2019/018751, filed on May 10, 2019, which claims priority to JP 20184092479, filed May 11, 2018, both of which are incorporated by reference in their entirety.

TECHNICAL FIELD

The present disclosure relates to a deflection amount estimating device, a robot control device, and a method of estimating the amount of deflection.

BACKGROUND

Conventionally, controls for accurately positioning robots including components with low stiffness (rigidity) while considering deflection are proposed. In such conventional controls. a displacement on a secondary side of a power transmission element of a drive shaft of an arm is acquired, and then, a displacement on a primary side of the power transmission element is estimated by an observer based on the acquired displacement on the secondary side so as to execute a feedback control.

In recent years, in order to reduce a cycle time, speed of industrial robots has increased, and links of arms of the robots have been reduced in weight. However, the speed increase and weight reduction causes deflections to the links of the arms and vibrations due to the deflections, which lowers a positioning accuracy. Therefore, it is desired to estimate an amount of deflection so that positioning can be accurately controlled by preventing the vibration considering the deflection of the link. In particular, although a robotic arm using a four-bar linkage structure, such as a parallel-linkage structure, can realize a stable operation under a high-load condition, the linkage structure is complicated, and thus, the estimation of the amount of deflection is difficult. Further, a stiffness of the link of the arm is high in conventional devices and, as a result, the deflection is not considered. Thus, according to conventional techniques, it is difficult to deal with the acceleration and the weight reduction of the link of the arm.

SUMMARY

A deflection amount estimating device according to one aspect of the present disclosure is a device for estimating an amount of deflection of a four-bar linkage structure part of a robotic arm comprised of a plurality of links coupled to each other via joints. The plurality of links include the four-bar linkage structure part which swings in a given angle range. The deflection amount estimating device includes processing circuitry configured to calculate a swing angle of the four-bar linkage structure part; calculate a load received by the four-bar linkage structure part; determine a stiffness value, corresponding to the swing angle of the four-bar linkage structure part, based on a stiffness-value determining function indicating a correlation between the stiffness value and the swing angle of the four-bar linkage structure part, the stiffness value indicating a value of each element in a stiffness matrix associating the load received by the four-bar linkage structure part with the amount of deflection of the four-bar linkage structure part; and calculate the amount of deflection of the four-bar linkage structure part based on the load received by the four-bar linkage structure part and the stiffness matrix having the stiffness value elements.

DETAILED DESCRIPTION OF THE DRAWINGS

A deflection amount estimating device according to one aspect is a device for estimating an amount of deflection of a four-bar linkage structure part of a robotic arm comprised of a plurality of links coupled to each other via joints, the robotic arm including the four-bar linkage structure part configured to swing in a given angle range. The deflection amount estimating device comprises processing circuitry configured to calculate a swing angle of the four-bar linkage structure part; calculate a load received by the four-bar linkage structure part; determine a stiffness value, corresponding to the swing angle of the four-bar linkage structure part, based on a stiffness-value determining function indicating a correlation between the stiffness value and the swing angle of the four-bar linkage structure part, the stiffness value indicating a value of each element in a stiffness matrix associating the load received by the four-bar linkage structure part with the amount of deflection of the four-bar linkage structure part; and calculate the amount of deflection of the four-bar linkage structure part based on the load received by the four-bar linkage structure part and the stiffness matrix having the stiffness value elements.

A deflection amount estimating device according to another aspect is a device for estimating an amount of deflection of a four-bar linkage structure part of a robotic arm comprised of a plurality of links coupled to each other via joints. The robotic arm include the four-bar linkage structure part which swings in a given angle range. The deflection amount estimating device includes a swing angle calculating module, a load calculating module, a stiffness-matrix determining module, and a deflection amount calculating module. The swing angle calculating module calculates a swing angle of the four-bar linkage structure part. The load calculating module calculates a load received by the four-bar linkage structure part. The stiffness-matrix determining module determines a stiffness value corresponding to the swing angle of the four-bar linkage structure part detected by the swing angle calculating module based on a stiffness-value determining function indicating a correlation between the stiffness value and the swing angle of the four-bar linkage structure part. The stiffness value is a value of each element in a stiffness matrix which associates the load received by the four-bar linkage structure part with the amount of deflection of the four-bar linkage structure part. The deflection amount calculating module calculates the amount of deflection of the four-bar linkage structure part based on the load received by the four-bar linkage structure part which is calculated by the load calculating module, and the stiffness matrix having the stiffness value elements determined by the stiffness-matrix determining module.

According to this configuration, the amount of deflection of the four-bar linkage structure can be promptly estimated by using the stiffness matrix having the stiffness value elements determined based on the swing angle. Therefore, the amount of calculation in the process of calculating the deflection amount can be lessened, and the deflection amount can be promptly calculated.

The four-bar linkage structure part may have a closed linkage structure.

According to this structure, the robotic arm can be suitably configured.

The four-bar linkage structure part may have a parallel-linkage structure.

According to this structure, the robotic arm can be suitably configured.

The stiffness-value determining function may be a function obtained by acquiring the stiffness value corresponding to each of a plurality of different swing angles by an analysis in advance, and linearly interpolating the stiffness values acquired by the analysis corresponding to the plurality of swing angles.

According to this configuration, the amount of calculation in the process of calculating the deflection amount can be lessened, and thus, the deflection amount can be promptly calculated.

A robot control device according to another aspect includes the deflection amount estimating device described above.

According to this configuration, the deflection amount of the four-bar linkage structure can be promptly estimated by using the stiffness matrix having the stiffness value elements determined based on the swing angle. Therefore, the amount of calculation can be lessened, and the deflection amount can be promptly calculated. Accordingly, an operation speed of a robot body can be improved.

Hereinafter, description will be provided with reference to the drawings. Note that the present disclosure is not limited to any particular embodiment. Moreover, below, the same reference characters are given to the same or corresponding components throughout the drawings in order to omit redundant description.

Figure 1:
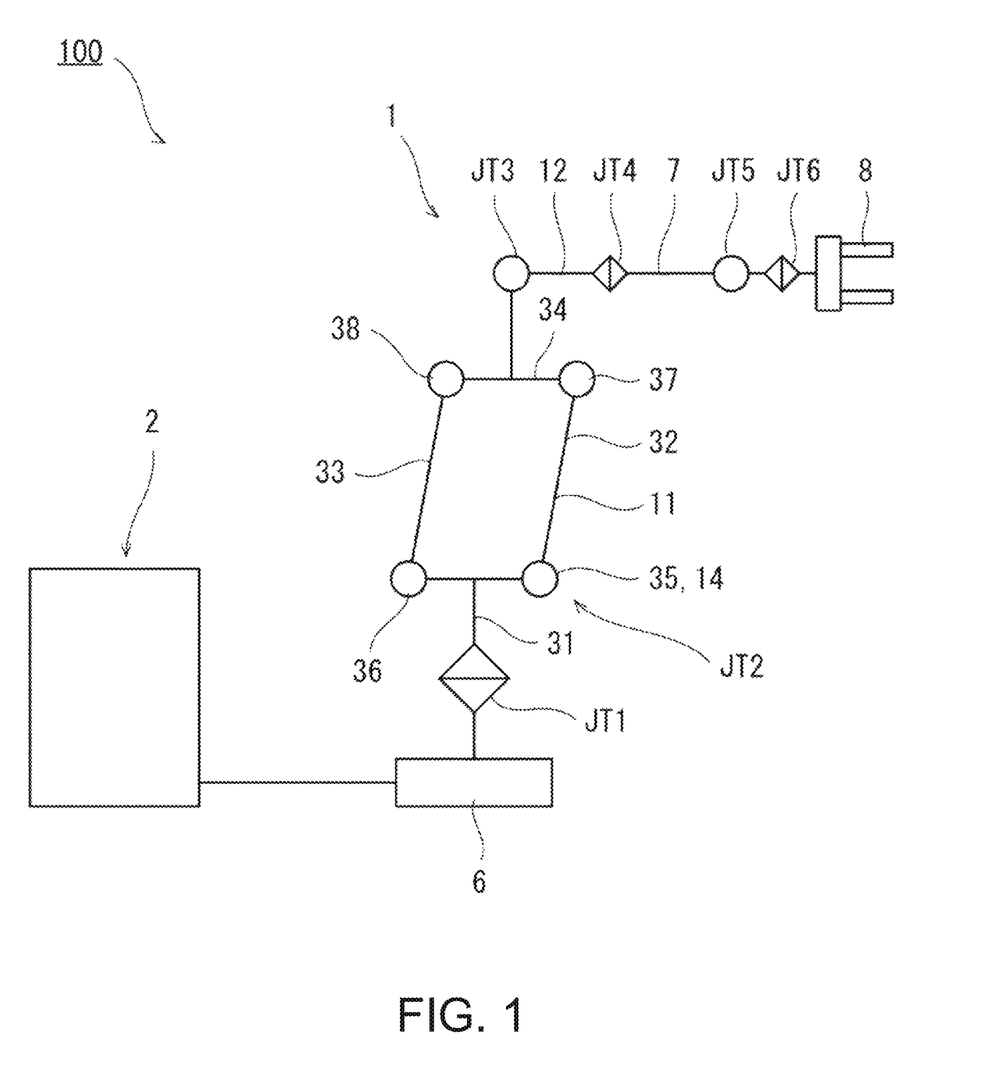
FIG. 1 is a view schematically illustrating an exemplary configuration of a robot system including a deflection amount estimating device.

FIG. 1 is a view schematically illustrating an exemplary configuration of a robot system 100, which includes a deflection amount estimating device, which is discussed later. As illustrated in FIG. 1, the robot system 100 includes a robot body 1 and a robot controller 2.

[Example of Configuration of Robot Body]

In exemplary configurations, the robot body 1 is an articulated industrial robot (an articulated robot). Moreover, the robot body 1 is a robot using a parallel-linkage structure as a lower-arm structure 11 which supports an upper-arm structure 12 and a hand 8. The robot body 1 has a high mechanical stiffness, and can realize a stable operation under a high-load condition.

The robot body 1 further includes a pedestal 6, a robotic arm 7, and the hand 8. The pedestal 6 is disposed, for example, so as to be fixed to a floor, and supports the robotic arm 7 and the hand 8.

The robotic arm 7 has a structure in which a plurality of links are coupled via joints. The robotic arm 7 includes the lower-arm structure 11, the upper-arm structure 12, a joint driving part 13, and a lower-arm driving part 14. The lower-arm structure 11 is coupled to the pedestal 6, for example, so as to be rotatable about a swiveling axial line extending in a vertical direction. A structure coupling the pedestal 6 and the lower-arm structure 11 is a first joint JT1. Moreover, the upper-arm structure 12 is coupled to the lower-arm structure 11 so as to be rotatable about an upper-arm rotating axial line orthogonal to the swiveling axial line. A structure coupling the lower-arm structure 11 and the upper-arm structure 12 is a third joint JT3. In the robotic arm 7, an operation mechanism of the lower-arm structure 11 can be regarded as a joint (second joint JT2), and the robotic arm 7 includes six joint axes as a total including the second joint JT2. Among these joint axes, five joint axes except for the lower-arm structure 11 are driven by the joint driving parts 13 provided to the respective joint axes, and each of the five axes rotates a link on its distal-end side with respect to a link on its proximal-end side about a rotation axis. Moreover, the lower-arm structure 11 is driven by the lower-arm driving part 14. The upper-arm structure 12 has a serial linkage structure, and is configured similarly to an upper-arm structure of a 6-axis vertical articulated robot. Note that in this specification the term "distal-end side" means the hand 8 side, and "proximal-end side" means the pedestal 6 side in an extending direction of the robotic arm 7.

The lower-arm structure (four-bar linkage structure part) 11 is an arm structure which swings within a given angle range. The lower-arm structure 11 includes a base 31, a driving link 32, a driven link 33, and a middle link 34. The base is coupled to the pedestal 6 so as to be rotatable about the swiveling axial line. The driving link 32 and the driven link 33 are coupled at proximal-end parts thereof to the base 31 via a first coupling axis 35 and a second coupling axis 36, respectively. Moreover, the driving link 32 and the driven link 33 are coupled at distal-end parts thereof to the middle link 34 via a third coupling axis 37 and a fourth coupling axis 38, respectively. Each coupling axis couples one link to the other link so as to be rotatable about the rotation axial line. Moreover, axial lines of the respective coupling axes extend orthogonally to the swiveling axial line, and parallel to each other. Then, a distance between the first coupling axis 35 and the second coupling axis 36 is the same as a distance between the third coupling axis 37 and the fourth coupling axis 38, and a distance between the first coupling axis 35 and the third coupling axis 37 is the same as a distance between the second coupling axis 36 and the fourth coupling axis 38. That is, the lower-arm structure 11 has the parallel-linkage structure, and the four-bar linkage structure having four links closed annularly. Then, the driving link 32 and the driven link 33 symmetrically swing, and a swing angle of the driving link 32 is equal to a swing angle of the driven link 33. Accordingly, the third joint JT3 can maintain a posture with respect to the first joint JT1.

The lower-arm driving part 14 drives and swings the lower-arm structure 11. The lower-arm driving part 14 is provided with a servomotor and a reduction gear attached to the base 31, and an output shaft of the servomotor is fixedly coupled via the reduction gear to the driving link 32 at the first coupling axis 35. Therefore, the lower-arm driving part 14 swings the driving link 32 by its driving force. Moreover, the lower-arm driving part 14 has an encoder 14a which detects an angular position of the output shaft of the servomotor. Information detected by the encoder 14a, on the angular position of the output shaft of the servomotor is inputted into a processor 21 and servo amplifiers 23 of the robot controller 2. Likewise, the joint driving part 13 has an encoder 13a which detects an angular position of the output shaft of the servomotor. Information detected by the encoder 13a, on the angular position of the output shaft of the servomotor is inputted into a processor 21 and servo amplifiers 23 of the robot controller 2.

[Example of Configuration of Robot Controller]

Figure 2:
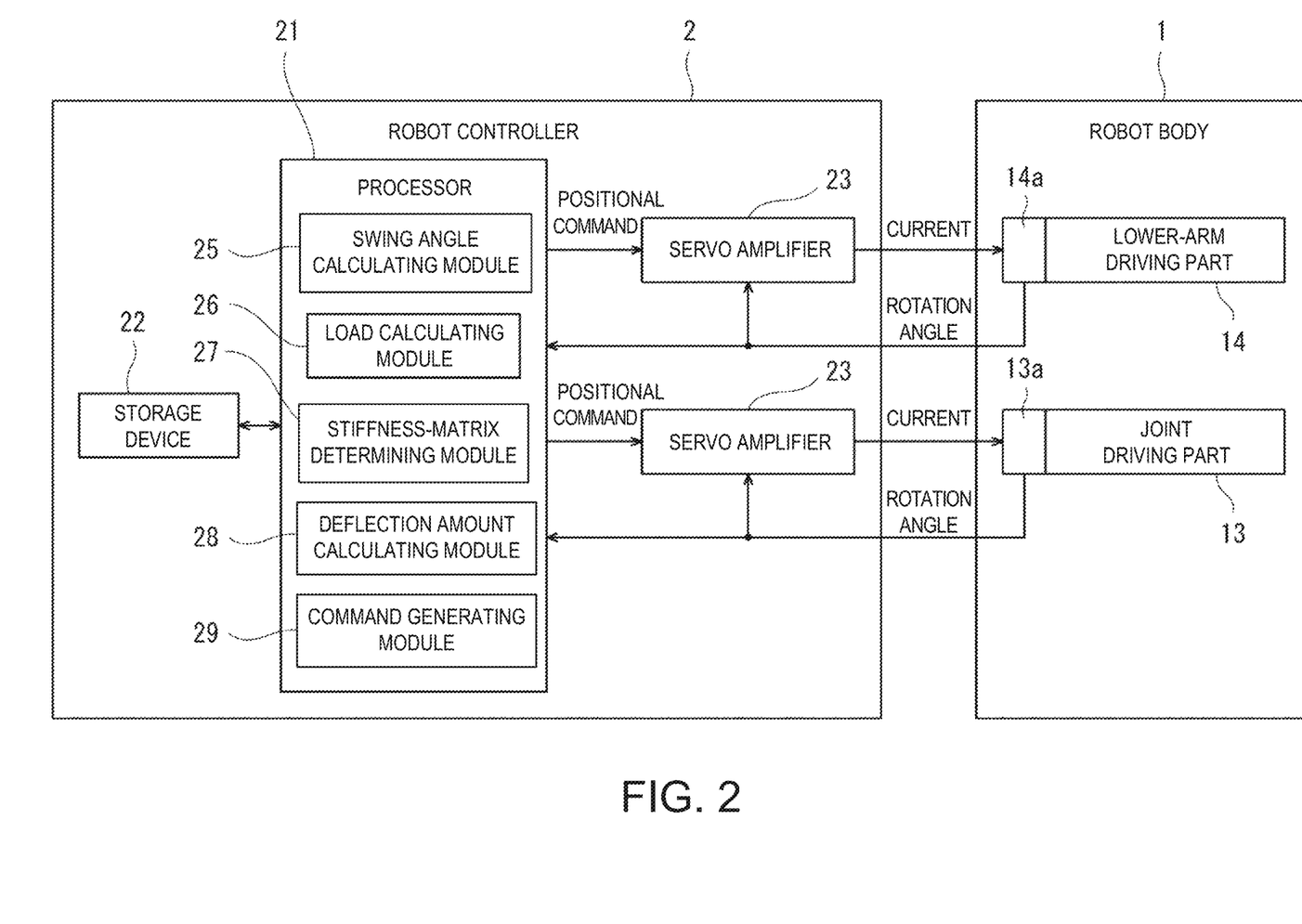
FIG. 2 is a block diagram schematically illustrating an exemplary configuration of a control system of the robot system illustrated in FIG. 1.

FIG. 2 is a block diagram schematically illustrating an exemplary configuration of a control system of the robot system 100.

As illustrated in FIG. 1, the robot controller (a robot control device) 2 controls robot body 1. In particular, robot controller 2 is placed around the robot body 1, and executes a positional control, a velocity control, or a current control of the shaft to be controlled of the robot body 1. However, robot controller 2 need not be placed around robot body 1. In some implementations, robot controller 2 may be a component on, in, adjacent 2 or separated from robot 1.

As illustrated in FIG. 2, the robot controller 2 includes, for example, the processor 21 having a processing unit such as a CPU, a storage device 22 having a memory such as a ROM and a RAM, and a plurality of servo amplifiers 23 provided to the respective servomotors of the lower-arm driving part 14 and the joint driving parts 13. Moreover, the robot controller 2 estimates a deflection amount of the four-bar linkage structure part, that is, an amount of displacement in a position and a posture of the third joint JT3 with respect to the first joint JT1 caused by the deflection of the lower-arm structure 11. The robot controller 2 may be comprised of a sole controller which executes a centralized control, or a plurality of controllers which execute a distributed control by cooperating with each other.

The processor 21 includes a swing angle calculating module 25, a load calculating module 26, a stiffness-matrix determining module 27, a deflection amount calculating module 28, and a command generating module 29.

The swing angle calculating module 25, the load calculating module 26, the stiffness-matrix determining module 27, and the deflection amount calculating module 28 consist the deflection amount estimating device.

Modules 25 to 29 are components implemented by the processor 21 executing a given control program stored in the storage device 22 (details will be described in an example of operation). The storage device 22 stores the given control program, and the processor 21 reads and executes the control program so as to control the operation of the robot body 1. Moreover, the storage device 22 stores a stiffness-value determining function which will be described later.

Further, robot controller 2 may be comprised of circuitry, processing circuitry, a single circuitry or plural sub-circuits. Sub-components of robot controller 2 may be encompassed in or be comprised of separate circuitry.

The functionality of the elements disclosed herein including but not limited to robot controller 2, processor 21, storage device 22, server amplifier 23 and modules 25-29. Such functionality and components may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

A deflection amount estimating device in accordance with the present disclosure is a device which estimates an amount of dynamic deflection of the lower-arm structure 11 due to a dynamic load caused by an acceleration and deceleration of the robotic arm 7 when the robotic arm 7 operates. The deflection amount estimating device estimates the amount of displacement in the position and posture of the distal-end part (the third joint JT3) with respect to the proximal-end part (the first joint JT1) of the lower-arm structure 11. For example, processing circuitry of a deflection amount estimating device is configured to estimate an amount of displacement in a position and posture of a distal-end part with respect to a proximal-end part of the lower-arm structure 11.

The servo amplifiers 23 control the corresponding servomotors. The servo amplifiers 23 may be separate components from the processing circuitry. That is, in the positional control, each servo amplifier 23 executes, for example, a follow-up control of the servomotor so that a deviation between the current angular position of the output shaft of the servomotor and an angular position determined based on a positional command value generated by the command generating module 29, becomes zero.

[Example of Operation]

Next, an example of operation of estimating the amount of deflection in the robot system 100 is described.

Figure 3:
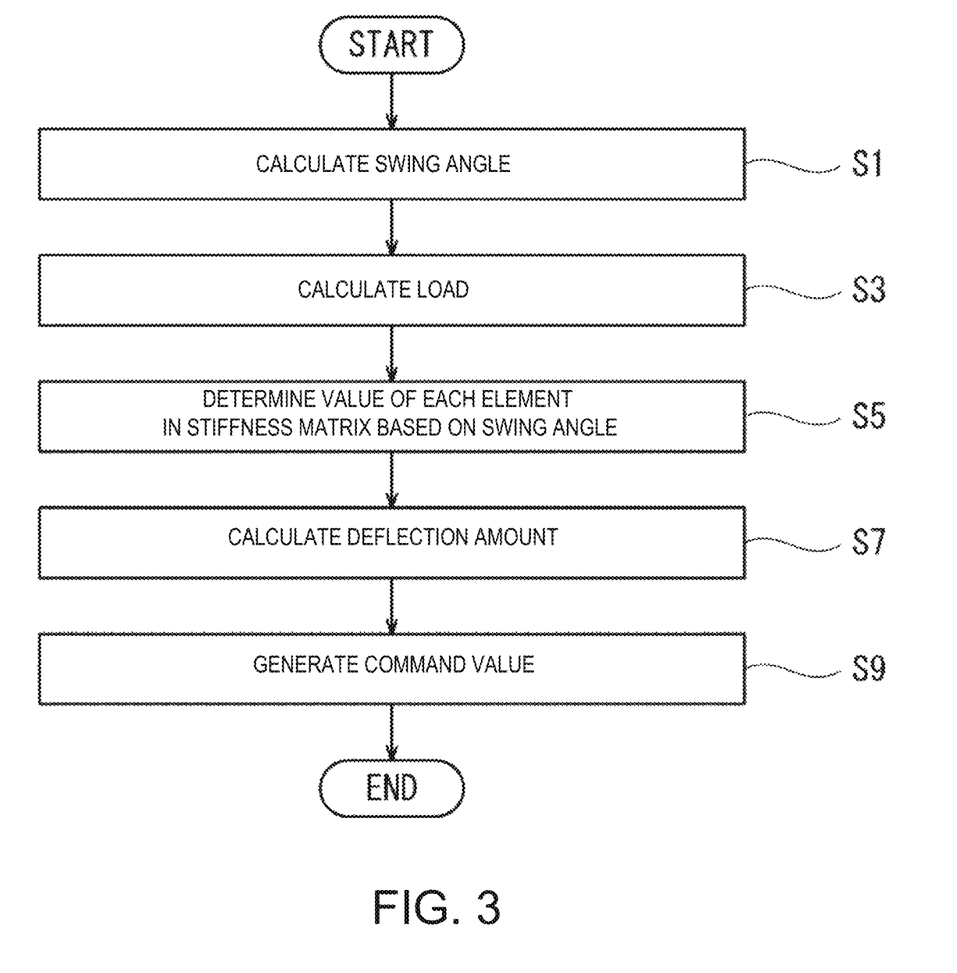
FIG. 3 is a flowchart illustrating an exemplary process for estimating an amount of deflection in the robot system illustrated in FIG. 1.

FIG. 3 is a flowchart illustrating an exemplary process for estimating an amount of deflection in the robot system 100.

First, the swing angle calculating module 25 calculates the swing angle of the lower-arm structure 11 based on the information detected by the encoder 14a of the lower-arm driving part 14, on the angular position of the output shaft of the servomotor which drives the driving link 32 (Step S1).

Next, the load calculating module 26 calculates a load received by the lower-arm structure 11 (Step S3). The load received by the lower-arm structure 11 is a dynamic load received by the lower-arm structure 11 corresponding to the acceleration and deceleration of the links during the operation of the robotic arm 7. The load calculating module 26 treats the amount of load by assigning a sign, and for example, a positive load occurs due to the acceleration of the links at a timing the robotic arm 7 starts swinging, and a negative load occurs due to the deceleration of the links at the time of ending the swinging.

Next, the stiffness-matrix determining module 27 determines a stiffness value, which is a value of each element in a stiffness matrix (rigidity matrix) C, corresponding to the swing angle of the lower-arm structure 11 detected by the swing angle calculating module 25 (Step S5). The stiffness matrix C is a 6×6 symmetric matrix which associates a load (a force including forces and moments in six directions, or a wrench) w received by the lower-arm structure 11 with an amount of deflection δ of the lower-arm structure 11, and includes 36 elements $c_{11}$ to $c_{66}$ indicated in the following Formula (1).

$$C = \begin{bmatrix} c_{11} & c_{12} & c_{13} & c_{14} & c_{15} & c_{16} \\ c_{21} & c_{22} & c_{23} & c_{24} & c_{25} & c_{26} \\ c_{31} & c_{32} & c_{33} & c_{34} & c_{35} & c_{36} \\ c_{41} & c_{42} & c_{43} & c_{44} & c_{45} & c_{46} \\ c_{51} & c_{52} & c_{53} & c_{54} & c_{55} & c_{56} \\ c_{61} & c_{62} & c_{63} & c_{64} & c_{65} & c_{66} \end{bmatrix} \quad (1) $$

The stiffness-matrix determining module 27 determines the stiffness value by using the stiffness-value determining function defined independently for each of the 36 elements (21 elements, if excluding symmetrical elements).

The stiffness-value determining function is a function indicating a relationship between the stiffness value and the swing angle of the lower-arm structure 11, and can be calculated by an analysis using the finite element method (FEM). That is, the stiffness values corresponding to the plurality of different swing angles are acquired in advance by the analysis. For example, if the angle when the driving link 32 stands upright is 0°, inclines forward is positive, and inclines backward is negative, the stiffness values for the respective states where the driving link 32 inclines by −60°, −30°, 0°, 30°, and 60° are acquired. Then, the stiffness values corresponding to the plurality of swing angles acquired by the analysis are linearly interpolated, and this is set as the stiffness-value determining function.

Figure 4A:
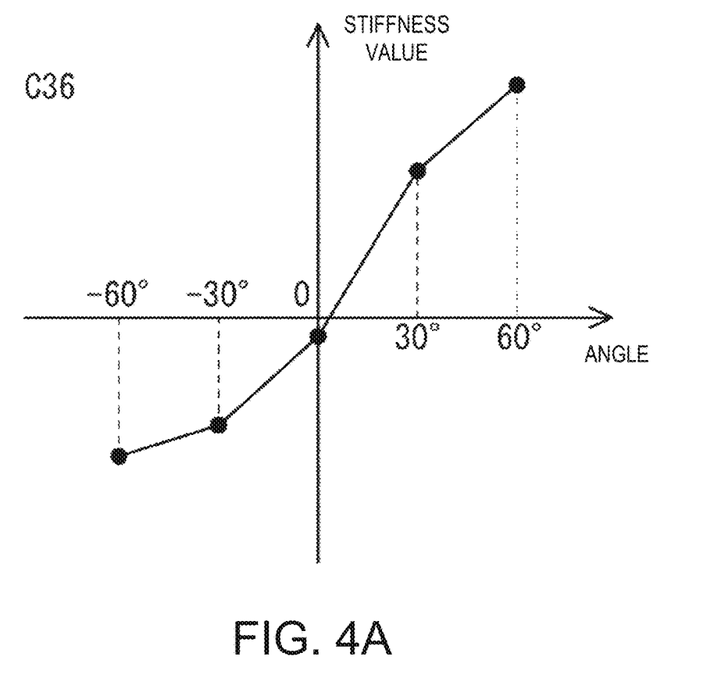
FIG. 4A is a diagram illustrating an example of a stiffness-value determining function used in an operation of estimating the amount of deflection in the robot system illustrated in FIG. 1.
Figure 4B:
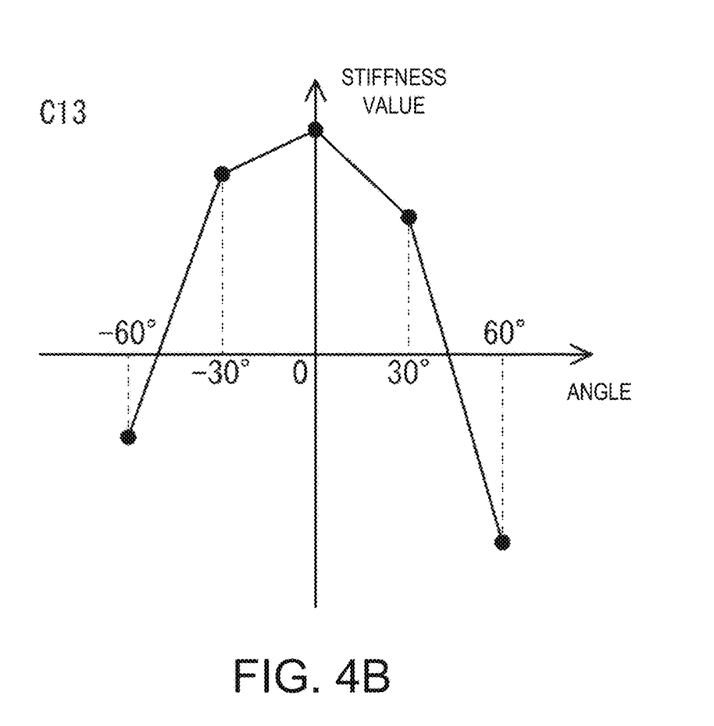
FIG. 4B is a diagram illustrating another example of the stiffness-value determining function used in an operation of estimating the amount of deflection in the robot system illustrated in FIG. 1.

FIG. 4A is one example of the stiffness-value determining function of the element $c_{36}$, and FIG. 4B is one example of the stiffness-value determining function of the element $c_{13}$. Moreover, a sampling interval for acquiring the stiffness value by the finite element method is set so that the linear interpolation makes a tendency of a change in the stiffness value to be indicated, and as illustrated in FIGS. 4A and 4B, the tendency of the change in the stiffness value can be obtained by acquiring the stiffness value for every 30°.

Next, the deflection amount calculating module 28 calculates the deflection amount δ of the lower-arm structure 11 based on the load received by the lower-arm structure 11, which is calculated by the load calculating module 26, and the stiffness matrix C which is determined based on the stiffness values determined by the stiffness-matrix determining module 27 (Step S7). That is, the deflection amount calculating module 28 calculates the deflection amount δ by using a function according to the following Formula (2).

$$\delta = Cw \quad (2)$$

Note that, $w = [f_x \ f_y \ f_z \ m_x \ m_y \ m_z]^T$, $f_x$, $f_y$, and $f_z$ are components of forces F in x, y, and z directions, respectively, and $m_x$, $m_y$, and $m_z$ are components of moments M about x, y, and z axes, respectively.

Meanwhile, normally, the serial linkage has a linear relationship between the wrench w and the deflection amount S. However, in the four-bar linkage structure, as illustrated in FIGS. 4A and 4B, the relationship between the wrench w and the deflection amount δ is nonlinear, and the stiffness matrix C has the stiffness value elements respectively indicating different changing tendencies corresponding to the swing angles, and thus, the estimation of the deflection amount δ is difficult. However, the deflection amount estimating device of the robot system 100 uses the stiffness matrix C having the stiffness value elements $c_{11}$ to $c_{66}$ determined based on the swing angles in order to promptly estimate the deflection amount δ of the four-bar linkage structure. Therefore, for example, compared with a case in which equations indicating the relationships between the wrenches w and the deflection amounts δ of the respective links are simultaneously calculated, the amount of calculation can be lessened, and thus, the deflection amount can be promptly calculated. Accordingly, the operation speed of the robot body 1 can be improved. Note that, as illustrated in Formula (2), since a gravity component has a little influence in the estimation of the amount of dynamic deflection, this influence is ignored.

Next, the command generating module 29 generates a command value based on the operation program (Step S9). At this time, the command generating module 29 calculates an amount of compensation corresponding to the amount of dynamic deflection δ of the lower-arm structure 11 calculated by the deflection amount calculating module 28. This amount of compensation is an amount proportional to the acceleration of the lower-arm structure 11, and the amount of compensation at the start timing of swinging and that at the end timing of the operation have opposite signs, respectively. Therefore, the vibration of the robotic arm 7 caused by the acceleration and deceleration of the robotic arm 7 can be reduced.

As described above, the deflection amount estimating device uses the stiffness matrix C having the stiffness value elements $c_{11}$ to $c_{66}$ determined based on the swing angles so as to promptly estimate the deflection amount δ of the four-bar linkage structure. This reduces an amount of calculation needed to calculate an amount of deflection. Therefore, the amount of calculation can be lessened and the deflection amount can be promptly calculated. Thus, the operation speed of the robot body 1 can be improved.

<Modification>

Although in the above embodiments the deflection amount estimating device estimates the amount of dynamic deflection δ, devise in accordance with the present disclosure are not limited to this. Alternatively, a deflection amount estimating device may calculate a static load by the load calculating module 26, and estimate an amount of static deflection by the deflection amount calculating module 28 based on a relationship between the static load and the amount of static deflection.

It is apparent for a person skilled in the art from the above description that many improvements and other embodiments of the present disclosure are possible. Therefore, the above description is to be interpreted only as illustration, and it is provided in order to teach a person skilled in the art the best mode to implement the present disclosure. The details of the structures and/or the functions may be substantially changed, without departing from the spirit of the present disclosure.

LIST OF REFERENCE CHARACTERS

JT1 First Joint
JT2 Second Joint
JT3 Third Joint
JT4 Fourth Joint
JT5 Fifth Joint
JT6 Sixth Joint
1 Robot Body
2 Robot Controller
6 Pedestal
7 Robotic Arm
8 Hand
11 Lower-arm Structure
13 Joint Driving Part
13a Encoder
14 Lower-arm Driving Part 14a Encoder
21 Processor
22 Storage Device
23 Servo Amplifier
25 Swing Angle Calculating Module
26 Load Calculating Module
27 Stiffness-matrix Determining Module
28 Deflection Amount Calculating Module
29 Command Generating Module
31 Base
32 Driving Link
33 Driven Link
34 Middle Link
35 First Coupling Link
36 Second Coupling Link
37 Third Coupling Link
38 Fourth Coupling Link
100 Robot System

What is claimed is:

1. A deflection amount estimating device for estimating an amount of deflection of a four-bar linkage structure part of a robotic arm comprised of a plurality of links coupled to each other via joints, the robotic arm including the four-bar linkage structure part configured to swing in a given angle range, the deflection amount estimating device comprising:
processing circuitry configured to
calculate a swing angle of the four-bar linkage structure part;
calculate a load received by the four-bar linkage structure part;
determine a stiffness value, corresponding to the swing angle of the four-bar linkage structure part, based on a stiffness-value determining function indicating a correlation between the stiffness value and the swing angle of the four-bar linkage structure part, the stiffness value indicating a value of each element in a stiffness matrix associating the load received by the four-bar linkage structure part with the amount of deflection of the four-bar linkage structure part; and
calculate the amount of deflection of the four-bar linkage structure part based on the load received by the four-bar linkage structure part and the stiffness matrix having the stiffness value elements.

2. The deflection amount estimating device of claim 1, wherein the four-bar linkage structure part has a closed linkage structure.

3. The deflection amount estimating device of claim 1, wherein the four-bar linkage structure part has a parallel-linkage structure.

4. The deflection amount estimating device of claim 1, wherein the processing circuitry obtains the stiffness-value determining function by
acquiring the stiffness value corresponding to each of a plurality of different swing angles by an analysis in advance, and
linearly interpolating the stiffness values acquired by the analysis corresponding to the plurality of swing angles.

5. A robot control device, comprising:
the robotic arm including the four-bar linkage structure part; and
the deflection amount estimating device of claim 1.

6. The robot control device of claim 5, wherein
the robot control device includes control circuitry that generates a command value, for controlling the robotic arm, by calculating an amount of compensation corresponding to the amount of deflection.

7. The robot control device of claim 6, wherein the control device is further configured to control the robotic arm according to the command value.

8. The robot control device of claim 6, wherein the command value reduces a vibration of the robotic arm caused by acceleration of the robotic arm.

9. A method of estimating an amount of deflection of a four-bar linkage structure part of a robotic arm comprised of a plurality of links coupled to each other via joints, the robotic arm including the four-bar linkage structure part configured to swing in a given angle range, the method comprising:
calculating a swing angle of the four-bar linkage structure part;
calculating a load received by the four-bar linkage structure part;
determining a stiffness value, corresponding to the calculated swing angle of the four-bar linkage structure part, based on a stiffness-value determining function indicating a correlation between the stiffness value and the swing angle of the four-bar linkage structure part, the stiffness value indicating a value of each element in a stiffness matrix associating the load received by the four-bar linkage structure part with the amount of deflection of the four-bar linkage structure part; and
calculating the amount of deflection of the four-bar linkage structure part based on the calculated load received by the four-bar linkage structure part and the stiffness matrix having the determined stiffness value elements.

10. The method of claim 9, wherein the four-bar linkage structure part has a closed linkage structure.

11. The method of claim 9, wherein the four-bar linkage structure part has a parallel-linkage structure.

12. The method of claim 9, further comprising obtaining the stiffness-value determining function by
acquiring the stiffness value corresponding to each of a plurality of different swing angles by an analysis in advance, and
linearly interpolating the stiffness values acquired by the analysis corresponding to the plurality of swing angles.

13. A system, comprising:
a robotic arm comprised of a plurality of links coupled to each other via joints and a four-bar linkage structure part, the four-bar linkage structure part configured to swing in a given angle range; and
processing circuitry configured to
calculate a swing angle of the four-bar linkage structure part;
calculate a load received by the four-bar linkage structure part;
determine a stiffness value, corresponding to the swing angle of the four-bar linkage structure part, based on a stiffness-value determining function indicating a correlation between the stiffness value and the swing angle of the four-bar linkage structure part, the stiffness value indicating a value of each element in a stiffness matrix associating the load received by the four-bar linkage structure part with an amount of deflection of the four-bar linkage structure part; and
calculate the amount of deflection of the four-bar linkage structure part based on the load received by the four-bar linkage structure part and the stiffness matrix having the stiffness value elements.

14. The system of claim 13, wherein the four-bar linkage structure part has a closed linkage structure.

15. The system of claim 13, wherein the four-bar linkage structure part has a parallel-linkage structure.

16. The system of claim 13, wherein the processing circuitry obtains the stiffness-value determining function by
- acquiring the stiffness value corresponding to each of a plurality of different swing angles by an analysis in advance, and
- linearly interpolating the stiffness values acquired by the analysis corresponding to the plurality of swing angles.

17. The system of claim 13, wherein the processing circuitry is further configured to generate a command value, for controlling the robotic arm, by calculating an amount of compensation corresponding to the amount of deflection.

18. The system of claim 17, wherein the processing circuitry is further configured to control the robotic arm according to the command value.

19. The system of claim 17, wherein the command value reduces a vibration of the robotic arm caused by acceleration of the robotic arm.

* * * * *